(12) United States Patent
Ramrakhyani et al.

(10) Patent No.: US 9,372,811 B2
(45) Date of Patent: Jun. 21, 2016

(54) RETENTION PRIORITY BASED CACHE REPLACEMENT POLICY

(71) Applicant: ARM LIMITED, Cambridge (GB)

(72) Inventors: Prakash Shyamlal Ramrakhyani, Austin, TX (US); Ali Ghassan Saidi, Austin, TX (US)

(73) Assignee: ARM Limited, Cambridge (GB)

( * ) Notice: Subject to any disclaimer, the term of this patent is extended or adjusted under 35 U.S.C. 154(b) by 181 days.

(21) Appl. No.: 13/713,999

(22) Filed: Dec. 13, 2012

(65) Prior Publication Data

US 2014/0173214 A1 Jun. 19, 2014

(51) Int. Cl.
*G06F 12/08* (2016.01)
*G06F 12/12* (2016.01)

(52) U.S. Cl.
CPC ............. *G06F 12/126* (2013.01); *G06F 12/08* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | |
|---|---|---|---|
| 3,964,054 A | 6/1976 | Annunziata et al. | |
| 5,906,000 A | 5/1999 | Abe et al. | |
| 5,943,687 A * | 8/1999 | Liedberg | 711/156 |
| 5,956,744 A | 9/1999 | Robertson et al. | |
| 5,963,978 A | 10/1999 | Feiste | |
| 6,282,617 B1 * | 8/2001 | Tirumala et al. | 711/133 |
| 6,349,365 B1 | 2/2002 | McBride | |
| 6,594,729 B1 * | 7/2003 | Sturges et al. | 711/129 |
| 6,973,541 B1 * | 12/2005 | Williams et al. | 711/135 |
| 6,976,128 B1 * | 12/2005 | Williams et al. | 711/135 |
| 8,510,510 B1 * | 8/2013 | Patil et al. | 711/136 |
| 2004/0083341 A1 * | 4/2004 | Robinson et al. | 711/133 |
| 2004/0117381 A1 * | 6/2004 | Yankovsky | 707/100 |
| 2005/0144409 A1 * | 6/2005 | Nodomi et al. | 711/167 |
| 2005/0188158 A1 | 8/2005 | Schubert | |
| 2006/0155939 A1 * | 7/2006 | Nagasoe et al. | 711/152 |
| 2008/0250280 A1 * | 10/2008 | Seh | 714/724 |
| 2009/0124241 A1 * | 5/2009 | Krishnaswamy et al. | 455/414.2 |
| 2009/0132768 A1 * | 5/2009 | Jones et al. | 711/144 |
| 2009/0150645 A1 * | 6/2009 | Ono et al. | 711/209 |

(Continued)

OTHER PUBLICATIONS

A. Basu et al, "Scavenger: A New Last Level Cache Architecture with Global Block Priority" Intl. Symp. on Microarchitecture (MICRO), Dec. 2007,.12 pages.

(Continued)

*Primary Examiner* — Jared Rutz
*Assistant Examiner* — Jean Edouard
(74) *Attorney, Agent, or Firm* — Nixon & Vanderhye P.C.

(57) ABSTRACT

A data processing system includes a cache memory 58 and cache control circuitry 56 for applying a cache replacement policy based upon a retention priority value PV stored with each cache line 66 within the cache memory 58. The initial retention priority value set upon inserting a cache line 66 into the cache memory 58 is dependent upon either or both of which of a plurality of sources issued the access memory request that resulted in the insertion or the privilege level of the memory access request resulting in the insertion. The initial retention priority level of cache lines resulting from instruction fetches may be set differently from cache lines resulting from data accesses.

22 Claims, 6 Drawing Sheets

(56) References Cited

U.S. PATENT DOCUMENTS

| | | | |
|---|---|---|---|
| 2009/0172315 A1 | 7/2009 | Iyer et al. | |
| 2009/0265514 A1* | 10/2009 | Biles et al. | 711/154 |
| 2010/0125677 A1* | 5/2010 | Bouvier | 710/5 |
| 2010/0153646 A1* | 6/2010 | Chen et al. | 711/122 |
| 2010/0235579 A1* | 9/2010 | Biles et al. | 711/125 |
| 2010/0318575 A1 | 12/2010 | Murphy et al. | |
| 2011/0145510 A1* | 6/2011 | Woffinden | 711/141 |
| 2011/0145511 A1* | 6/2011 | Woffinden | 711/141 |
| 2011/0145546 A1* | 6/2011 | Woffinden | 712/30 |
| 2011/0154001 A1* | 6/2011 | Jacob (Yaakov) et al. | 712/233 |
| 2012/0117328 A1 | 5/2012 | McKean et al. | |
| 2012/0297118 A1* | 11/2012 | Gorobets et al. | 711/103 |
| 2012/0311269 A1* | 12/2012 | Loh et al. | 711/133 |
| 2013/0024647 A1* | 1/2013 | Gove | 711/207 |

OTHER PUBLICATIONS

A. Jaleel et al, High Performance Cache Replacement Using Re-Reference Interval Prediction (RRIP), *ISCA'*10, Jun. 2010, 12 pages.

A. Jaleel et al, "Adaptive Insertion Policies for Managing Shared Caches" *PACT'*08, Oct. 2008, 12 pages.

A. Lai et al, "Dead-Block Prediction & Dead-Block Correlating Prefetchers" *Proceedings of the 28th Annual International Symposium on Computer architecture (ISCA)*, 2001, 11 pages.

C. Wu et al, "Ship: Signature-based hit Predictor for High Performance Caching" *MICRO'*11, Dec. 2011, 12 pages.

G. Keramidas et al, "Cache Replacement Based on Reuse-Distance Prediction" IEEE, 2007, pp. 245-250.

G.H. Loh, "Extending the Effectiveness of 3D-Stacked DRAM Caches with an Adaptive Multi-Queue Policy" *MICRO'*09, Dec. 2009, 12 pages.

H. Liu et al, "Cache Bursts: A New Approach for Eliminating Dead Blocks and Increasing Cache Efficiency" *Proceedings of the 41st Annual IEEE/ACM International Symposium on Microarchitecture*, 2008, 12 pages.

K. Rajan et al, "Emulating Optimal Replacement with a Shepherd Cache" 2007, 10 pages.

M. Chaudhuri, "Pseudo-LIFO: The Foundation of a New Family of Replacement Policies for Last-level Caches" *MICRO'*09, Dec. 2009, 12 pages.

M.K. Qureshi et al, "Adaptive Insertion Policies for High Performance Caching" *ISCA'*07, Jun. 2007, 11 pages.

N. Megiddo et al, "ARC: A Self-Tuning, Low Overhead Replacement Cache" *Proceedings of FAST'03: 2nd USENIC Conference on File and Storage Technologies*, Mar. 2003, pp. 115-130.

S. Bansal et al, "CAR: Clock with Adaptive Replacement" 2004, 14 pages.

S. Jiang et al, "LIRS: An Efficient Low Inter-reference Recency Set Replacement Policy to Improve Buffer Cache Performance" 2002, 12 pages.

T. Johnson et al, "2Q: A Low Overhead High Performance Buffer Management Replacement Algorithm" *Proceedings of the 20th VLDB Conference*, 1994, pp. 439-450.

W. Lin et al, "Predicting Last-Touch References under Optimal Replacement" 2002, pp. 1-17.

\* cited by examiner

RETENTION PRIORITY BASED CACHE REPLACEMENT POLICY

BACKGROUND OF THE INVENTION

1. Field of the Invention

This invention relates to the field of data processing systems. More particularly, this invention relates to cache replacement policies for use within data processing systems.

2. Description of the Prior Art

It is known to provide data processing systems with cache memories. Cache memories provide faster and more efficient access to frequently used data or instructions. A cache memory typically has a limited size compared to the main memory and accordingly only a subset of the instruction/data held within the main memory can be held within the cache memory at any given time. Cache memories are provided with replacement policies which determine the cache line (which may contain data and/or instructions) should be removed from the cache in order to make space for a new cache line to be fetched from the main memory and stored within the cache memory. There are many known examples of cache replacement policies, such as least recently used, round robin and random.

SUMMARY OF THE INVENTION

Viewed from one aspect the present invention provides an apparatus for processing data comprising:
 a plurality of sources of memory access requests;
 a cache memory coupled to said plurality of sources; and
 cache control circuitry coupled to said cache memory and configured to control insertion of cache lines into said cache memory and eviction of cache lines from said cache memory, wherein
 said cache control circuitry is configured to store respective retention priority values associated with each cache line inserted into said cache memory;
 said cache control circuitry is configured to select a cache line for eviction from said cache memory in dependence upon said retention priority values; and
 said cache control circuitry is configured to set a retention priority value associated with a cache line inserted into said cache memory in dependence upon at least one of:
  (i) which of said plurality of sources issued a memory access request that resulted in insertion of said cache line into said cache memory; and
  (ii) a privilege level of said memory access request.

The present technique recognises that an improved replacement policy may be achieved by associating a with each cache line a retention priority value that is dependent upon the source of the memory access request and/or the privilege level of the memory access request. The cache lines are then selected for eviction from the cache memory in dependence upon these allocated retention priority values (which may be modified during the residence of the cache line within the cache memory).

The cache control circuitry may be configured to evict cache lines having retention priority values corresponding to a low retention priority in preference to cache lines having retention priority values corresponding to a high retention priority. The retention priority values can accordingly be used to represent the predicted desirability of keeping a given cache line within the cache memory. The desirability to keep the cache line within the cache memory may be a consequence of the fact that it is frequently accessed or that there is a significant penalty if an access is delayed by the cache line by not being present within the cache memory. The retention priority values set in dependence upon the source of the original memory access request which triggered the fetch, and/or the privilege level of the memory access request that triggered the fetch, can increase the benefit achieved from the cache lines which are retained within the cache memory (or viewed in another way reduce the penalty incurred by the cache lines which are not retained within the cache memory).

In some example embodiments the plurality of sources may include instruction fetch circuitry configured to fetch program instructions for execution and data access circuitry configured to access data values to be subject to processing operations. As examples, both the instruction fetch circuitry and the data access circuitry may be part of a general purpose processor a graphics processing unit or a DSP. Depending upon whether a cache line was inserted within the cache memory as a consequence of a memory access by the instruction fetch circuitry or the data access circuitry, either an instruction retention priority value or a data retention priority value may be associated with that cache line. The instruction retention priority value and the data retention priority value differ to give a different likelihood of the cache line subsequently being evicted from the cache memory.

Depending upon the circumstances, it may be desirable for the instruction retention priority value to correspond to a higher retention priority than the data retention priority value. In other circumstances, it may be desirable that the opposite retention priority relationship should hold. Accordingly, in some embodiments the cache control circuitry is responsive to a flag to set one of the above relationships.

While it is possible that this flag could be controlled by a physical hardware signal, in some embodiments the flag value is a software programmable flag program value which controls whether or not instructions or data are preferentially retained within the cache memory by virtue of having different retention priority values allocated to them when they are inserted within the cache memory.

In some embodiments the instruction fetch circuitry and the data access circuitry are part of an in-order processor and in this situation it is desirable that the instruction retention priority value should have a lower retention priority than the data retention priority value i.e. it is desirable to preferentially retain data within the cache memory over instructions (at least to the extent of applying a bias in favour of retaining data over instructions rather than precluding instructions from being retained).

While this is possible that the retention priority values could be stored anywhere within the system (e.g. within the cache control circuitry), it is convenient in some embodiments that the retention priority values are stored within the cache memory together with their associated cache lines (most likely with the TAG values if the cache memory contains a separate TAG memory and data memory). The cache lines can be extended by one or more bits to readily accommodate the retention priority values associated therewith.

When selecting a cache line for eviction, the cache control circuitry is responsive to the retention priority values associated with the cache lines. In some embodiments the cache control circuitry may be configured to select a cache line eviction from among those cache lines having associated retention priority values corresponding to a lowest retention priority value that may be represented. Within this pool of cache lines corresponding to the lowest retention priority, the cache control circuitry could select in accordance with another policy, such as round robin or least recently used, but it is simple if a random selection is made among those cache lines having associated retention priority values corresponding to the lowest retention priority.

If there are no cache lines with an associated retention priority value corresponding to the lowest retention priority value and accordingly eligible for eviction, in some embodiments the cache controller is configured to demote in retention priority all of the cache lines within the cache memory until at least one cache line has retention priority value corresponding to the lowest retention priority and accordingly is eligible for eviction. Such demotion could be achieved by changing the retention priority values that are stored or by changing the mapping between the stored retention priority values and the priorities which they represent.

The retention priority values associated with a cache line when it is inserted vary in dependence upon the source of the corresponding memory access request or the privilege level as discussed above. Thereafter the retention priority value may be changed in dependence upon activity associated with that cache line individually or the activity of the cache memory generally. In some embodiments the cache control circuitry is configured to detect an access to a cache line already present in the cache memory (a hit) and to change that retention priority value upon such a hit so as to promote the cache line in retention priority. Thus, cache lines which are regularly accessed will have their retention priority promoted in a manner such that they are preferentially retained within the cache memory.

The promotion of the retention priority values of the cache lines upon a cache hit could take place in a variety of different ways. In some embodiments a cache line that is hit has its retention priority value incrementally promoted upon each access toward a highest maximum retention priority value (which once reached is not subject to further promotion upon a hit) or alternatively may be changed to move directly to a highest retention priority when a hit occurs.

As previously discussed, the plurality of sources for which different retention priority values are associated could take the form of instruction fetch circuitry verses data access circuitry. In other embodiments the plurality of sources could include a general purpose processor and a graphics processing unit which have different retention priority values associated with the cache lines which they trigger to be inserted within a cache memory shared between the general purpose processor and the graphics processing unit. As an example, a graphics processing unit may be able to tolerate a longer latency associated with memory accesses which miss within the cache memory and accordingly it is desirable to bias cache resources toward the general purpose processor by allocating cache lines inserted into the cache memory on behalf of the general purpose processor retention priority values corresponding to a higher retention priority.

Another example of the plurality of sources may be a plurality of general purpose processor which are potentially identical. However, some of these processors may be allocated more time critical tasks and accordingly it is appropriate that the retention of cache lines within the cache memory shared by that plurality of general purpose processors should be biased towards the processors having the greatest need for rapid access to instructions or data (e.g. some of the processors may be executing real time tasks which are performance critical while other of the processors may be executing background maintenance tasks which can readily tolerate a longer latency).

The cache memory within which the present techniques are applied can take a variety of different forms at positions within a memory system. In some embodiments the cache memory is a level two cache memory whereas in other embodiments the cache memory may be a level three cache memory.

It will be appreciated that the retention priority value could have a variety of different bit sizes dependent upon the granularity it is desired to specify. There is a balance between the degree of granularity supported and the storage resource needed to store the retention priority values. In some embodiments a compromise is achieved with the retention priority value being a two-bit retention priority value.

As previously mentioned, the retention priority value that is allocated to a cache line upon insertion into the cache memory may vary in dependence upon a privilege level associated with the memory access request that fetch the cache line to the cache memory. In this way cache line retention may be biased to favour cache lines fetched by memory access requests with higher privilege levels. As an example, the apparatus may execute both a kernel program and one or more user programs and the privilege level of the kernel program is higher than that of the one or more user programs. In this case, for example, cache lines inserted into the cache memory on behalf of the kernel program may be given higher retention priority for retention over those inserted on behalf of one or more user programs. The reverse may also be true in other embodiments, i.e. cache lines inserted on behalf of a user program are given a higher priority than cache lines inserted on behalf of the kernel program.

Viewed from another aspect of the present invention provides an apparatus for processing data comprising:
  a plurality of source means for generating memory access requests;
  cache memory means for storing data; and
  cache control means for controlling control insertion of cache lines into said cache memory means and eviction of cache lines from said cache memory means, wherein
    said cache control means is configured to store respective retention priority values associated with each cache line inserted into said cache memory means;
    said cache control means is configured to select a cache line for eviction from said cache memory means in dependence upon said retention priority values; and
    said cache control means is configured to set a retention priority value associated with a cache line inserted into said cache memory means in dependence upon at least one of:
    (i) which of said plurality of sources issued a memory access request that resulted in insertion of said cache line into said cache memory means; and
    (ii) a privilege level of said memory access request.

Viewed from a further aspect the present invention provides a method of processing data comprising the steps of:
  generating memory access requests with a plurality of sources;
  storing data within a cache memory; and
  controlling control insertion of cache lines into said cache memory means and eviction of cache lines from said cache memory means, said method further comprising the steps of:
  storing respective retention priority values associated with each cache line inserted into said cache memory;
  selecting a cache line for eviction from said cache memory means in dependence upon said retention priority values; and
  setting a retention priority value associated with a cache line inserted into said cache memory in dependence upon at least one of:
    (i) which of said plurality of sources issued a memory access request that resulted in insertion of said cache line into said cache memory; and
    (ii) a privilege level of said memory access request.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF THE EMBODIMENTS

Figure 1:
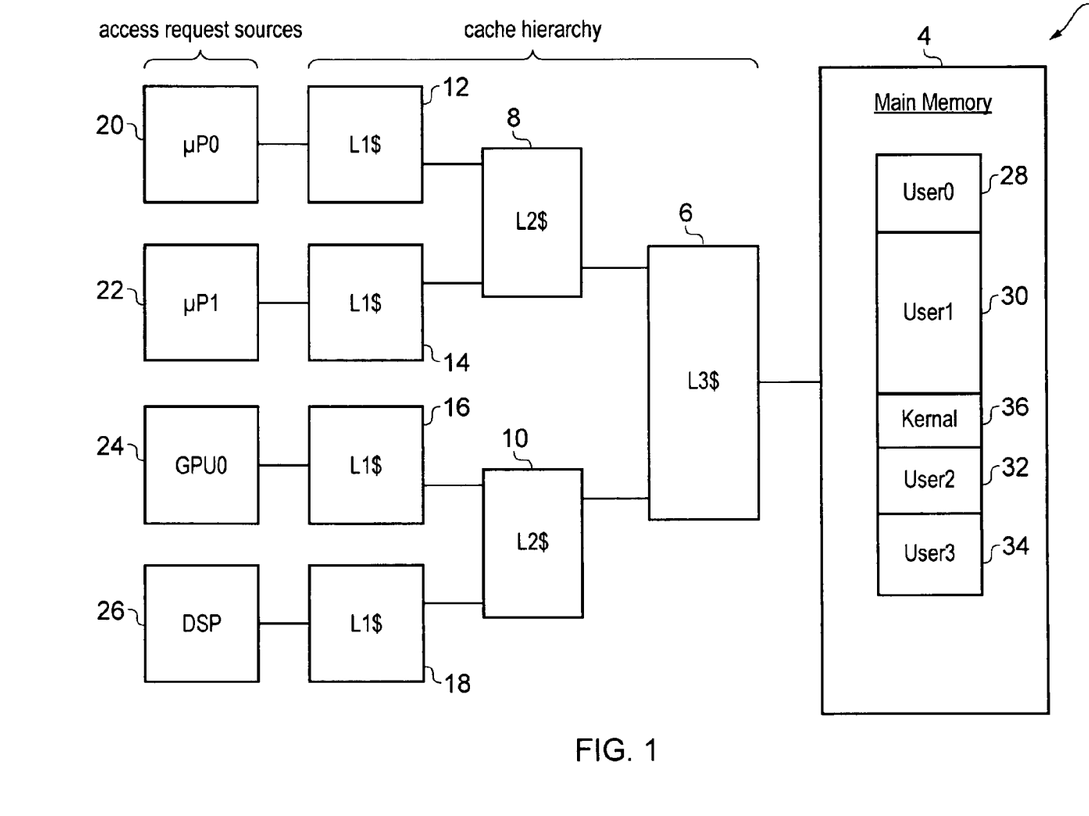
FIG. 1 schematically illustrates a data processing system including a plurality of access request sources, a cache hierarchy and a main memory.

FIG. 1 schematically illustrates an apparatus processing data 2 comprising a main memory 4, a cache hierarchy including a level three cache 6, two level two caches 8, 10, four level one caches 12, 14, 16, 18 and a plurality of sources of memory access requests including two general purpose processors 20, 22, a graphics processing unit 24 and a DSP unit 26.

The various cache memories 6 to 18 are arranged in a hierarchy. All of the access request sources 20, 22, 24, 26 share the single level three cache 6. The two general purpose processors 20, 22 share the level two cache 8. The graphics processing unit 24 and the DSP 26 share the level two cache 10. Each of the access request sources 20, 22, 24, 26 has its own level one cache 12, 14, 16, 18. The present techniques can be applied in any of the caches 6 to 18 although they find particular utility in the level two caches 8, 10 and the level three cache 6.

Also illustrated in Figure is the main memory 4. This main memory 4 supports a memory address space within which different ranges of memory addresses may be primarily used by different programs or tasks executing on the various access request sources 20, 22, 24, 26. A cache line fetched into any of the cache memories 6 to 18 will have a corresponding address (actually a small range of addresses) within the main memory 4. As illustrated in FIG. 1 different ranges of memory addresses are used by different ones of a plurality of user programs 28, 30, 32 and 34 and a different range of memory addresses 36 is used for a kernel program (part of the operating system comprising code that may be frequently executed in certain operational modes). A memory management unit (not illustrated) may be provided to restrict access to different regions of the main memory 4 in dependence upon a current privilege level source of the memory access access request. Privilege level can also be used to control retention priority. As will be discussed later, the memory address(es) associated with a cache line may be used to determine a retention priority value allocated to that cache line when it is inserted within one of the cache memories 6 to 18. The memory address space is divided into a plurality of ranges of memory addresses such that different retention priority values can be associated with different ranges of memory addresses.

Figure 2:
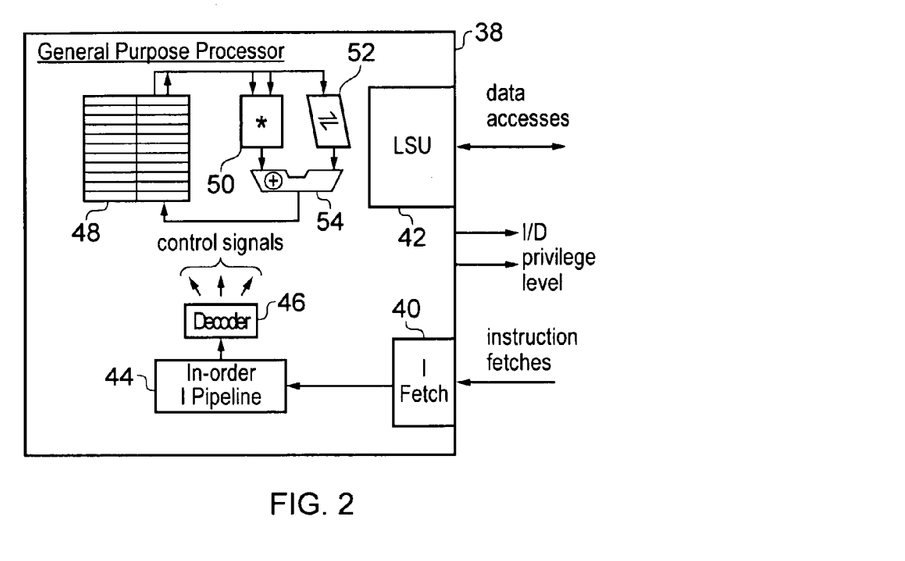
FIG. 2 schematically illustrates a general purpose processor including instruction fetching circuitry and data access circuitry.

FIG. 2 schematically illustrates a general purpose processor 38 which includes instruction fetching circuitry 40 and data access circuitry 42. The instruction fetch circuitry 40 fetches a stream of program instructions which are passed to an in-order instruction pipeline 44 along which they progress as they undergo various stages of processing. At least one of these stages of processing decodes the instruction with an instruction decoder 46 and generates control signals which control processing circuitry such as a register bank 48, a multiplier 50 a shifter 52 and an adder 54 to perform processing operations specified by the program instruction decoded. The data access circuitry 42 is in the form of a load store unit (LSU) and performs data accesses to read and write data values that are subject to processing operations under control of the program instructions executed by the processing circuitry 48, 50, 52, 54. The general purpose processor 38 output signals which identify whether a memory access request relates to instructions or data and an associated privilege level.

It will be appreciated that FIG. 2 is a stylized representation of a general purpose processor 38 and in practice the general purpose processor 38 will typically include many further circuit elements. These circuit elements have been omitted from FIG. 2 for the sake of clarity.

The data and instructions which are accessed via the instruction fetch circuitry 40 and the data access circuitry 42 may be stored within any of the levels of the cache hierarchy 6 to 18 and will also be stored in the main memory 4. A memory access request is passed up through the cache hierarchy until a hit occurs or it is passed out to the main memory 4 if no hit occurs. When no hit occurs, this is a miss and a cache line including the data (or instruction) to which an access is sought will be fetched from the main memory 4 into the cache hierarchy 6 to 18. If a miss occurs within one of the higher level caches (e.g. level one caches 12 to 18, but a hit occurs within one of the lower level caches, such as the level two caches or the level three cache 6), then the cache line will be retrieved from that lower level cache into the higher level cache that is closer to the source of the memory access request. The present techniques may be used to allocate a retention priority value upon insertion as a cache line is copied from one level in the cache hierarchy to another level.

When a memory access request is made from one of the access request sources 20, 22, 24, 26, then it is accompanied by a signal which identifies the source of the memory access request as well as one identifying the privilege level of program execution currently in place. As an example, the accompanying signal could differentiate between the memory access request originating from the instruction fetch circuitry 40 or the data access circuitry 42. If the memory access request results in a miss, then this signal indicating the source of the memory access request may be used to set the retention priority value associated with the cache line corresponding to the miss when that cache line is inserted into the cache memory where the miss occurred. These different retention priority values that are associated with cache lines inserted as a result of instruction fetches or data accesses may then later be used to control the selection of cache lines from eviction from the cache memory.

The above describes a different setting of retention priority value based upon whether the source is the instruction fetch circuitry 40 or the data access circuitry 42. Different retention priority values could also be set depending upon, for example, other factors such as whether or not the source was one of the general purpose processors 20, 22 or the graphics processing unit 24. In other embodiments, the two general purpose processors 20, 22 could be performing different types of tasks and have associated different retention priority values used for cache lines filled into a shared cache memory on their behalf (e.g. one processor 20 could be performing real time tasks to be allocated high cache retention priority and the other processor 22 could by performing background tasks of lower retention priority).

Another way of controlling the retention priority value associated with a cache line which is inserted into a cache memory (which may be used separately or in combination with the source identifier) is based upon the privilege level associated with that cache line. A kernel program will typically execute with a higher level of privilege than a user program and cache line retention may be biased (using the retention priority values upon insertion) to favour cache lines fetched by a kernel program over those fetched by one or more user programs.

Figure 3:
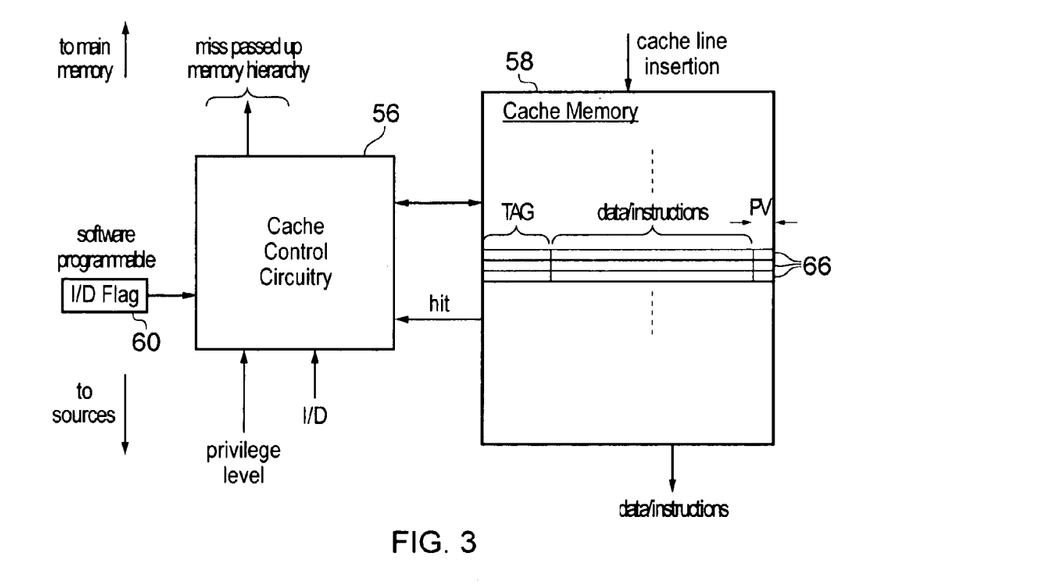
FIG. 3 schematically illustrates cache control circuitry for inserting cache lines with different accompanying retention priority values and then performing cache line eviction in dependence upon those retention priority values.

FIG. 3 schematically illustrates cache control circuitry 56 coupled to a cache memory 58. The cache control circuitry 56 receives a memory access request specifying a memory address, a signal identifying whether it is an instruction fetch or a data access from one of the sources of memory access requests and a privilege level signal. The cache control circuitry 56 is responsive to a software programmable flag value 60 which indicates whether instructions are given a higher retention priority than data or whether data is given a higher retention priority than instructions. In the case of an in-order general purpose processor, such as that illustrated in FIG. 2, it has been found that giving data cache lines a higher retention priority than instruction cache lines yields improved performance. The software programmable flag value 60 allows this preference to be selected under software control to suit individual circumstances.

Cache lines associated with memory access requests with a kernel privilege level will be given a higher retention priority than those associated with a user privilege level and accordingly will be preferentially retained within the cache memory 58. The cache control circuitry 56 controls determining whether a memory access request can be serviced by the cache lines 66 stored within the cache memory 58 (corresponding to a hit) or whether the cache memory 58 does not contain a corresponding cache line and accordingly reference must be made to higher up within the cache memory hierarchy (corresponding to a miss). When a miss occurs, then the data will subsequently be returned from higher up within the memory hierarchy and stored into the cache memory 58 (unless the memory access is marked as uncacheable).

If the cache memory 58 is already full, then an existing cache line must be removed from the cache memory 58 in order to make space for the newly fetched cache line. The replacement policy may be dependent upon the retention priority values PV stored within the cache memory 58 by the cache control circuitry 56 when each cache line was inserted as will be described later below. The retention priority values PV are set at initial values when the cache lines are inserted, but can change depending upon use of the cache lines while they are present within the cache memory 58 as well as upon other aspects of the operation of the cache memory 58 which can arise (e.g. global demotion to give a pool of potential victim cache lines).

Figure 4:
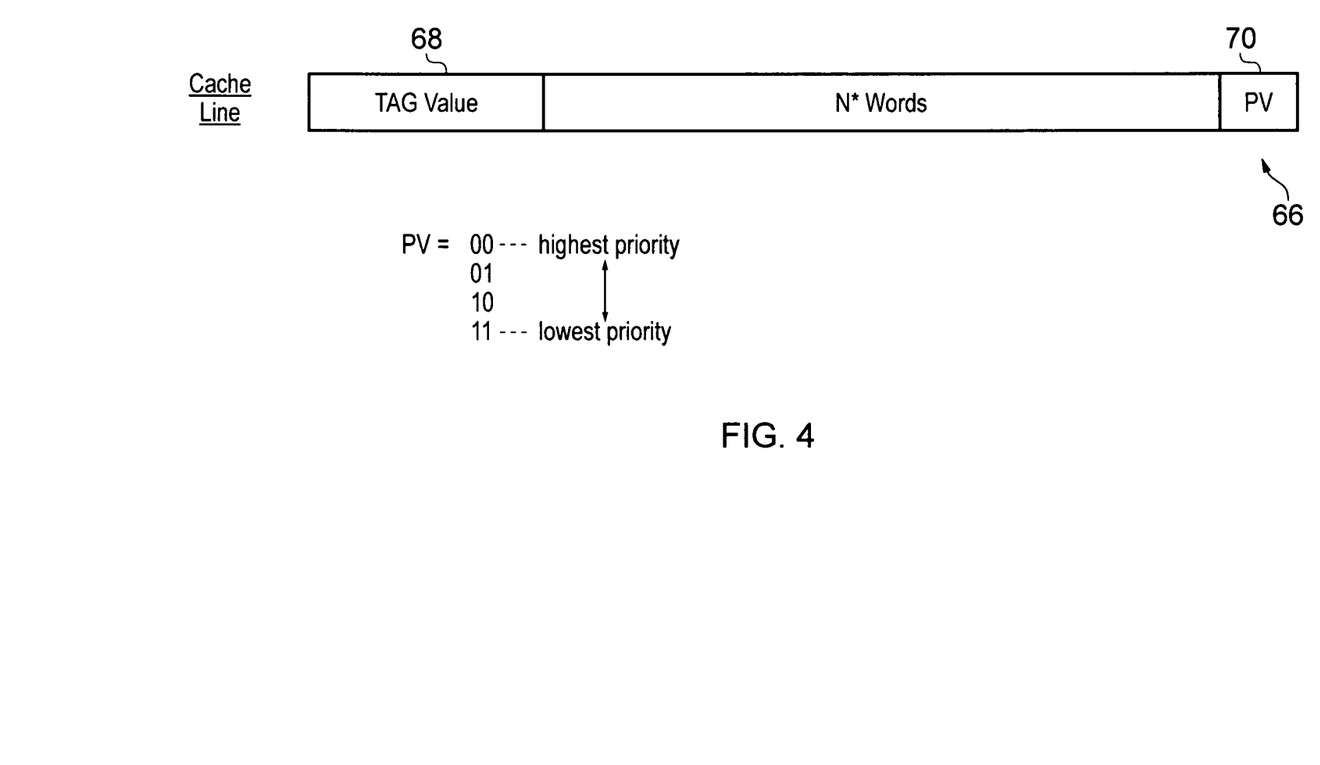
FIG. 4 schematically illustrates the content of one cache line.

FIG. 4 schematically illustrates a cache line 66. In this example, the cache line includes a TAG value 68 corresponding to a memory address from where the N words of instructions or data constituting the cache line have been taken from the memory address space of the main memory 4. Also included within the cache line is a two-bit retention priority value 70. This retention priority value is encoded as shown with a retention priority value of "00" corresponding to the highest retention priority and a retention priority value of "11" corresponding to the lowest retention priority. In the examples to be discussed further below, when a cache line is inserted to the cache memory 58 by the cache controller 56 it will be inserted with an initial retention priority value 70 that is either "11" corresponding to the lowest retention priority or a retention priority value of "10" corresponding to one level of retention priority higher than the lowest retention priority. Other initial values could be used, e.g. "01" for the higher retention priority and "10" for the lower retention priority. When a hit occurs upon a cache line which is already stored within a cache memory, then its retention priority value may, in some embodiments, be decremented by one subject to reaching a limiting value of "00" corresponding to the highest retention priority. In other embodiments when a hit occurs for a cache line already stored within the cache memory 58, then its retention priority value may be immediately changed to "00" corresponding to the highest retention priority.

It will be appreciated that FIG. 4 illustrates a cache line with the TAG and the data stored together. In practice, the TAG may be stored separately from the data. In this case the retention priority value can be stored with the TAG, together with other bits, such as a valid bit and a dirty bit.

The retention priority value is more generally an n-bit retention priority value. This gives $2^n$ possible retention priority values K=0, 1, . . . $2^n-1$. The retention priority values allocated to the different classes of cache line insertions (e.g. data vs instruction or kernel vs user) are selected such that they sum to $2^n-1$. This evenly distributes the retention priority values in the available bit space. Different starting insertion values can be selected to, for example, strongly favour data (data=00, instruction=11), weakly favour data (data=01, instruction=10), weakly favour instructions (data=10, instruction=01) or strongly favour instructions (data=11, instruction=00). These different starting values corresponding to different policies that maybe selected between (e.g. by hardware or software configuration).

Figure 5:
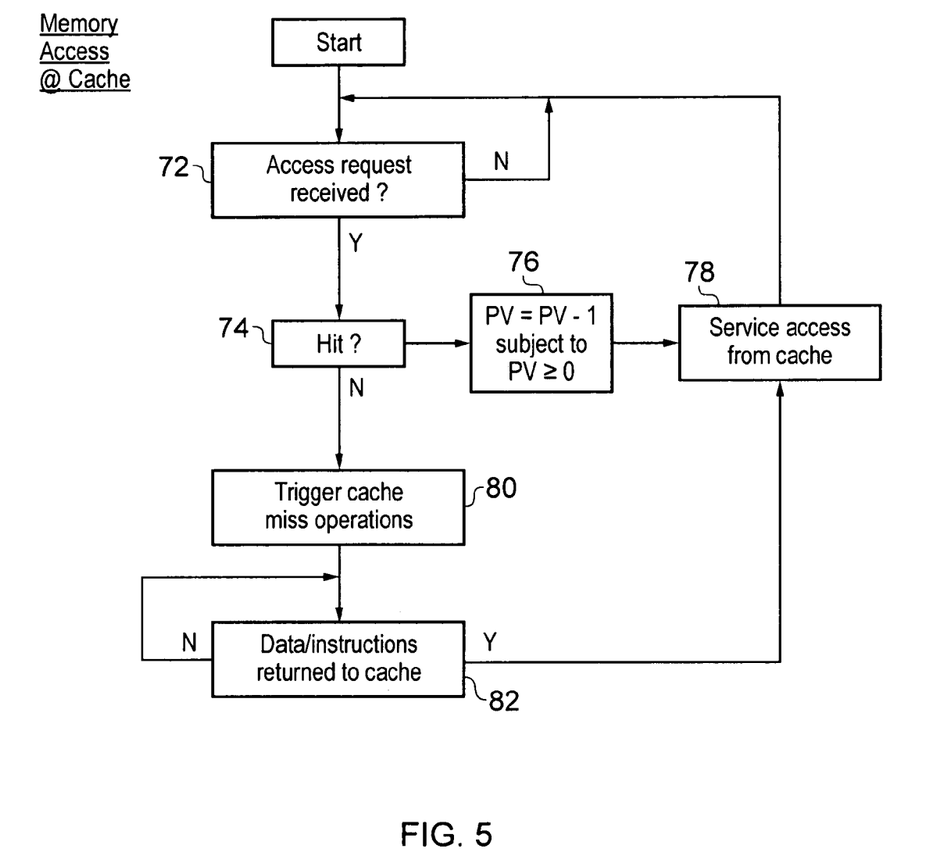
FIG. 5 is a flow diagram schematically illustrating the operation of the cache control circuitry in response to a received memory access request.

FIG. 5 is a flow diagram schematically illustrating the operation of the cache control circuitry 56 and the cache memory 58 at a given level within the ache hierarchy 6 to 18 in servicing a memory access request. At step 72 processing waits until an access request is received. At step 74 a determination is made as to whether or not the access request corresponds to data or instructions which are already present within one of the cache lines within the cache memory 58. If the memory access request corresponds to a cache line which is already present, then this is a hit and processing proceeds to step 76. At step 76 the retention priority value for the cache line that has hit is decremented by one (corresponding to promoting the retention priority level by one) subject to the retention priority value reaching a minimum possible value of "00". After step 76, step 78 serves to service the memory access request from the cache memory 58 and processing returns to step 72.

If there is no hit detected at step 74, then processing proceeds to step 80 where cache miss operations are triggered as will be described further below. Processing then waits at step 82 for the cache line of data or instructions to be returned to the cache memory 58. Once the data/instructions have been returned and have been inserted into the cache memory 58 (or in parallel with such insertion) then processing proceeds to step 78 where the memory access request is serviced.

Figure 6:
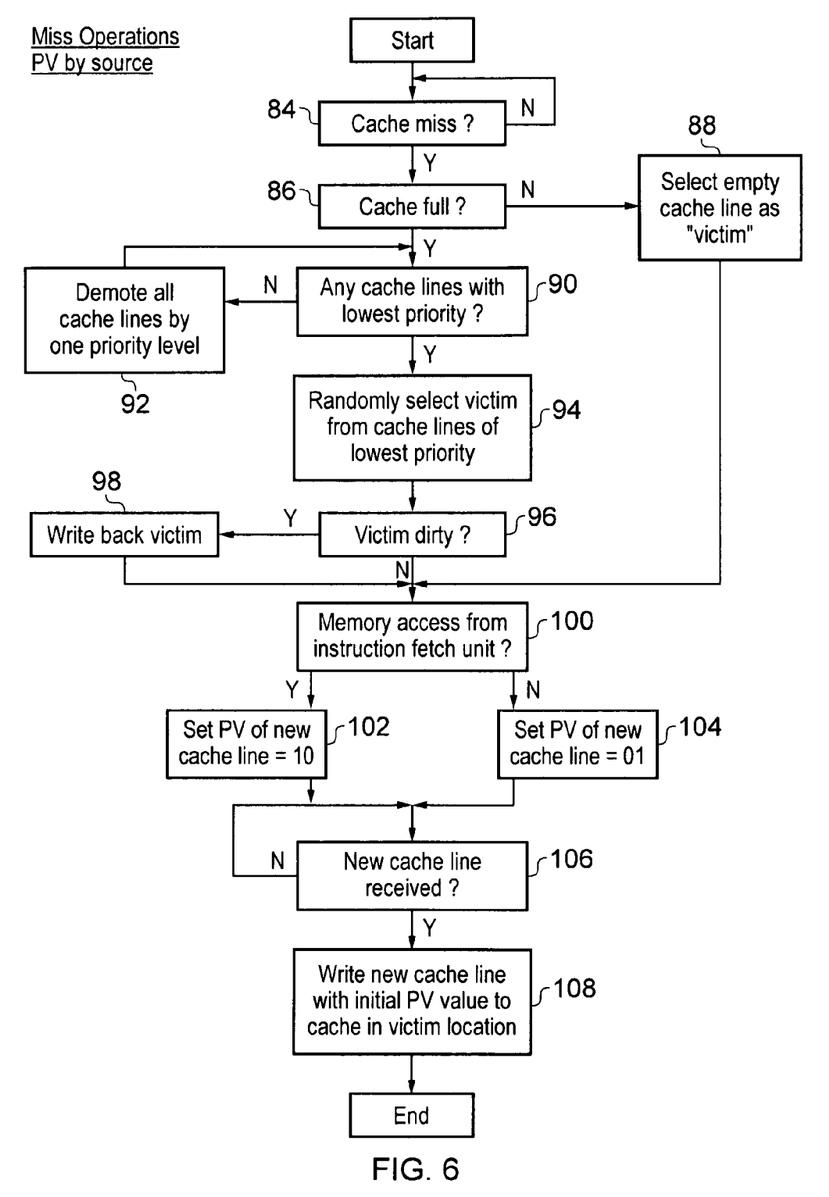
FIG. 6 is a flow diagram schematically illustrating processing operations performed in relation to a cache miss when the retention priority value is set in accordance with the source of the memory access request.

FIG. 6 is a flow diagram schematically illustrating the miss operations performed by the cache control circuitry 56 and the cache memory 58 upon a miss as triggered by step 80 in FIG. 5. At step 84 processing waits until a cache miss is detected. Step 86 determines whether or not the cache memory is currently full. If the cache memory is not currently full, then processing proceeds to step 88 where one of the currently empty cache lines is randomly selected as the "victim" into which a newly fetched cache line can be filled.

If the determination at step 86 is that the cache is already full, then a victim must be selected from among the currently occupied cache lines. Step 90 determines whether there are any of the currently occupied cache lines which have the lowest retention priority. In the example discussed previously, this would correspond to cache lines having a retention priority value of "11". If there are no such cache lines with the lowest retention priority, then processing proceeds to step 92 where all of the cache lines currently held within the cache memory 58 are demoted by one level in retention priority. This could be achieved by changing all of the stored retention priority values PV. However, a more efficient embodiment may change the mapping between the stored retention priority values and the retention priority levels to achieve the same result. After all of the cache lines have been demoted by one retention priority level, then processing returns to step 90 where the check for any cache lines for the lowest retention priority level is repeated. Processing cycles through steps 90 and 92 until at least one cache line with the lowest retention priority level is detected at step 90.

Following step 90 when at least one cache line with the lowest retention priority level has been detected, step 94 serves to randomly select a victim from the cache lines with the lowest retention priority (if a single cache line has this lowest retention priority then the selection will be of this single line). A random selection of victim from amongst the lowest retention priority cache line then is relatively simple to implement. Other selection policies from among this pool of lowest retention priority cache lines could be employed, such as a least recently used policy or a round robin policy. Such different policies would typically require additional resource to store state associated with their operation.

Once a victim cache line has been selected at step 94, step 96 determines whether or not that cache line is dirty (contains updated values different from those currently held in the main memory 4). If the cache line is dirty, then step 98 serves to write back the cache line to the main memory 4 before that cache line is overwritten with the newly inserted cache line.

Step 100 determines, in this example, whether the memory access which triggered the miss originated from the instruction fetch unit 40. If the memory access did originate from the fetch unit, then the cache line contains at least the instruction which was to be fetched and is marked with a retention priority value of "10" at step 102. If the determination at step 100 is that the memory access is not from the instruction fetch unit, then it will be from the load store unit 42 (data access circuitry) and a retention priority value PV of "01" is set at step 104. Step 106 then waits until the new cache line is received from lower down within the memory hierarchy (e.g. within one of the lower level cache memories or the main memory). When the cache line has been received at step 106, then step 108 serves to write the new cache line together with the initial retention priority value PV into the cache line which previously stored the victim which was selected at step 94.

Figure 7:
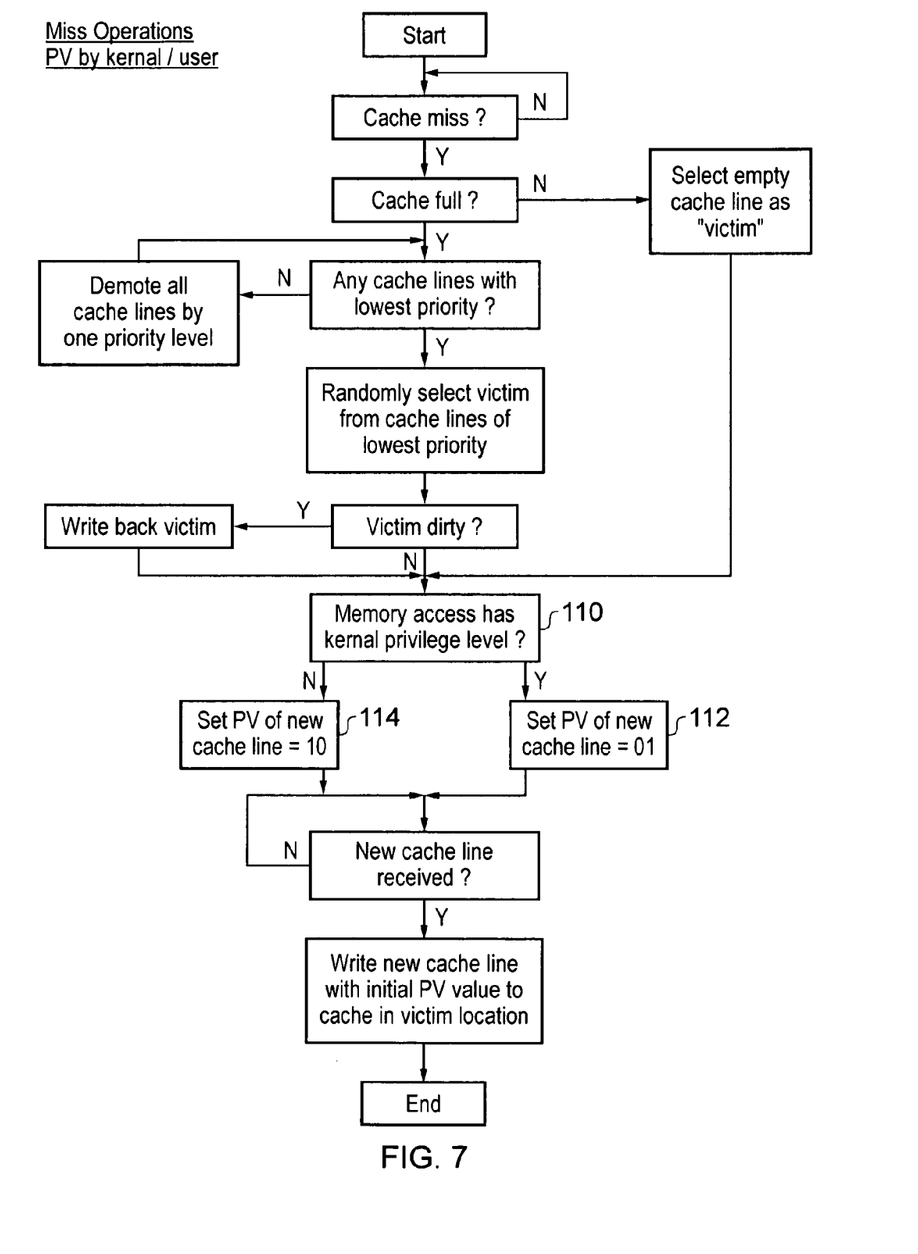
FIG. 7 is a flow diagram similar to that of FIG. 6 with the exception that the retention priority value is set in dependence upon whether the memory access which resulted in the miss has a kernel privilege level associated with a kernel program.

FIG. 7 is a flow diagram that is similar to that of FIG. 6. The difference in FIG. 7 is that the retention priority value is determined on the basis of whether or not the privilege level associated with the cache line for which the cache miss occurred is a kernel privilege level corresponding to a kernel program of an operating system. Once the victim cache line has been selected, then step 110 determines whether or not the memory access for which the cache line miss occurred has a privileged level corresponding to the kernel program. If the determination at step 110 is that the memory access has a kernel privilege level corresponding to a kernel program, then step 112 serves to set the retention priority value PV to be "01". Conversely, if the memory access has a user privilege level and does not correspond to the kernel program, then step 114 serves to set the initial retention priority value PV to "10". In this way, cache lines associated with the kernel program are given a higher initial retention priority and those associated with other programs (e.g. user programs).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a plurality of sources of memory access requests;
a cache memory coupled to said plurality of sources; and
cache control circuitry coupled to said cache memory and configured to control insertion of cache lines into said cache memory and eviction of cache lines from said cache memory, wherein
said cache control circuitry is configured to store respective retention priority values associated with each cache line inserted into said cache memory;
said cache control circuitry is configured to select a cache line for eviction from said cache memory in dependence upon said retention priority values; and
said cache control circuitry is configured to set a retention priority value associated with a cache line inserted into said cache memory in dependence upon at least one of:
(i) which of instruction fetch circuitry of a processor to fetch program instructions for execution and load store unit circuitry of said processor to access data values under control of said program instructions issued a memory access request that resulted in insertion of said cache line into said cache memory; and
(ii) a privilege level of program execution resulting in said memory access request.

2. Apparatus as claimed in claim 1, wherein said cache control circuitry is configured to evict cache lines having retention priority values corresponding to a low retention priority in preference to cache lines having retention priority values corresponding to a high retention priority.

3. Apparatus as claimed in claim 1, wherein
cache lines inserted into said cache memory as a result of a memory access request issued by said instruction fetch circuitry are associated with an instruction retention priority value and cache lines inserted into said cache memory as a result of a memory access request issued by said data access circuitry are associated with a data retention priority value different from said instruction retention priority value.

4. Apparatus as claimed in claim 3, wherein said cache control circuitry is responsive to a flag value to set one of:
  (i) said instruction retention priority value corresponds to a higher retention priority than said data retention priority value; and
  (ii) said instruction retention priority value corresponds to a lower retention priority than said data retention priority value.

5. Apparatus as claimed in claim 4, wherein said flag value is a software programmable flag value.

6. Apparatus as claimed in claim 3, wherein said instruction fetch circuitry and said data access circuitry are part of an in-order processor and said instruction retention priority value corresponds to a lower retention priority than said data retention priority value.

7. Apparatus as claimed in claim 1, wherein said retention priority values are stored within said cache memory together with TAG values of their associated cache lines.

8. Apparatus as claimed in claim 2, wherein said cache control circuitry is configured to select a cache line for eviction from among those cache lines having associated retention priority values corresponding to a lowest retention priority.

9. Apparatus as claimed in claim 8, wherein said cache control circuitry is configured to randomly select said cache line for eviction from among those cache lines having associated retention priority values corresponding to a lowest retention priority.

10. Apparatus as claimed in claim 8, wherein if there are no cache lines with an associated retention priority value corresponding to said lowest retention priority, then said cache controller is configured to demote in retention priority all of said cache lines within said cache memory until at least one cache line has a retention priority value corresponding to said lowest retention priority.

11. Apparatus as claimed in claim 2, wherein said cache control circuitry is configured to detect an access to a cache line already present in said cache memory and to change a retention priority value of said cache line to promote said cache line in retention priority.

12. Apparatus as claimed in claim 11, wherein said retention priority value is changed to one of:
  (i) promote said cache line incrementally in retention priority upon each access toward a highest retention priority; and
  (ii) promote said cache line directly to a highest retention priority.

13. Apparatus as claimed in claim 1, wherein said plurality of sources include a general purpose processor and a graphics processing unit.

14. Apparatus as claimed in claim 1, wherein said plurality of sources include a plurality of general purpose processors.

15. Apparatus as claimed in claim 1, wherein said cache memory is a level two cache memory within a hierarchy of cache memories including at least one level one cache memory and said level two cache memory.

16. Apparatus as claimed in claim 1, wherein said cache memory is a level three cache memory within a hierarchy of cache memories including at least one level one cache memory, at least one level two cache memory and said level three cache memory.

17. Apparatus as claimed in claim 1, wherein said retention priority value is an n-bit retention priority value and a sum of different retention priority values that can be set by said cache control circuitry upon insertion of cache lines is $2^n-1$.

18. Apparatus as claimed in claim 1, wherein cache lines inserted into said cache memory as a result of a memory access request with a kernel program privilege level are associated with a kernel retention priority value and cache lines inserted into said cache level are associated with a user retention priority value.

19. Apparatus as claimed in claim 18, wherein one of:
  said kernel retention priority value corresponds to higher retention priority than said user retention priority value; and
  said user retention priority value corresponds to a higher retention priority than said kernel retention priority value.

20. A method of processing data comprising the steps of:
  generating memory access requests with a plurality of sources;
  storing data within a cache memory; and
  controlling control insertion of cache lines into said cache memory and eviction of cache lines from said cache memory, said method further comprising the steps of:
  storing respective retention priority values associated with each cache line inserted into said cache memory;
  selecting a cache line for eviction from said cache memory in dependence upon said retention priority values; and
  setting a retention priority value associated with a cache line inserted into said cache memory in dependence upon at least one of:
    (i) which of instruction fetch circuitry of a processor to fetch program instructions for execution and load store unit circuitry of said processor to access data values under control of said program instructions issued a memory access request that resulted in insertion of said cache line into said cache memory; and
    (ii) a privilege level of program execution resulting in said memory access request.

21. Apparatus for processing data comprising:
  a plurality of sources of memory access requests;
  a cache memory coupled to said plurality of sources; and
  cache control circuitry coupled to said cache memory and configured to control insertion of cache lines into said cache memory and eviction of cache lines from said cache memory, wherein
  said cache control circuitry is configured to store respective retention priority values associated with each cache line inserted into said cache memory;
  said cache control circuitry is configured to select a cache line for eviction from said cache memory in dependence upon said retention priority values; and
  said cache control circuitry is configured to set a retention priority value associated with a cache line inserted into said cache memory in dependence upon a privilege level of program execution resulting in said memory access request.

22. A method of processing data comprising the steps of:
  generating memory access requests with a plurality of sources;
  storing data within a cache memory; and
  controlling control insertion of cache lines into said cache memory and eviction of cache lines from said cache memory, said method further comprising the steps of:
  storing respective retention priority values associated with each cache line inserted into said cache memory;
  selecting a cache line for eviction from said cache memory in dependence upon said retention priority values; and
  setting a retention priority value associated with a cache line inserted into said cache memory in dependence upon a privilege level of program execution resulting in said memory access request.

\* \* \* \* \*